United States Patent [19]

Gunther

[11] Patent Number: 4,594,855
[45] Date of Patent: Jun. 17, 1986

[54] PROCESS AND APPARATUS FOR VENTILATION WITH HEAT EXCHANGE

[76] Inventor: Arnold Gunther, 29 Lorelei Rd., West Orange, N.J. 07052

[21] Appl. No.: 726,850

[22] Filed: Apr. 24, 1985

[51] Int. Cl.⁴ .............................................. F25D 17/06
[52] U.S. Cl. ......................................... 62/92; 165/60; 62/304; 62/93
[58] Field of Search ................... 62/304, 309, 310, 93, 62/92; 261/161, 112, 160; 165/60

[56] References Cited

U.S. PATENT DOCUMENTS

| | | | |
|---|---|---|---|
| 3,997,635 | 12/1976 | Hallgren | 261/161 |
| 4,023,949 | 5/1977 | Schlom et al. | 62/310 |
| 4,380,910 | 4/1983 | Hood et al. | 62/304 |

*Primary Examiner*—Henry Bennett

[57] ABSTRACT

Outdoors and indoors air streams are induced to travel in opposite directions through the adjacent passages of a plate-fin heat exchanger. A water stream is simultaneously induced to circulate through the passages occupied by the cooler of the air streams. Heat is transferred across adjacent passages, causing vaporization of a portion of the water stream into its accompanying air stream, thus keeping the cooler stream saturated with water vapor. The hotter air stream is cooled and dehumified while the cooler one increases in temperature and humidity content. Very close temperature approaches can thus be achieved at the heat exchanger, with the resultant economies in the energy requirements for ventilation.

4 Claims, 7 Drawing Figures

PROCESS AND APPARATUS FOR VENTILATION WITH HEAT EXCHANGE

BACKGROUND OF THE INVENTION

Ventilation of confined spaces such as dwellings, buildings, cars, etc, where living and or industrial activities take place, is a common practice. The products of metabolic processes and of industrial activities generate substances such as water vapor, carbon dioxide, odors, dust, smoke, etc., which, if allowed to build-up in the confined space would render its atmosphere unsuitable for human occupancy.

This situation is avoided by extracting a certain amount of the indoors air and replacing it with uncontaminated outdoors fresh air.

The concentration of the contaminants may thus be kept at levels compatible with the desired or required degrees of comfort and safety.

The flowrate of indoors air extracted will depend on the rate of generation of the contaminants and on their desired or required concentration in the confined space.

The influx of outdoors air into a ventilated space will introduce an extra heating or cooling load, depending on the yearly seasons, due to the difference in temperatures between the outdoors and indoors.

In the winter an extra heating load is required to raise the temperature and humidity of the cold and dry air inflow to the levels maintained in the confined space. During the summer and extra cooling or refrigeration load is required to decrease the temperature and humidity of the incoming hot and humid air. These extra heating and refrigeration loads are a substantial part of the total ventilation load and cause an extra expenditure of fuel and or electric power.

Air to air heat exchangers have been used with limited success, to recover a portion of the extra heating load above mentioned. Beside their relatively low recovery efficiency, these devices have no capabilities for substantially increase or decrease the humidity of the air streams.

SUMMARY OF THE INVENTION

The main purpose of this invention is to provide means for substantially reducing the energy requirements for ventilation.

Another purpose is to provide a compact, efficient and cost effective apparatus for recovering heat from the air exhausted from indoors during the winter or heating season, while rejecting heat from the incoming outdoors air during the summer or cooling season.

Still another purpose is to provide the means, during the summer season, for substantially decreasing the temperature and humidity of the outdoors air stream fed into the confined space, and to achieve the opposite results during the winter season.

Other objectives will become apparent from the detailed description of the invention.

In the present invention, the outdoors and indoors streams are induced to travel in opposite directions, or countercurrently, through adjacent passages of a heat exchanger.

A water stream is simultaneously induced to circulate through the passages occupied by one of the air streams, and in intimate contact with it. The water stream is always contacted with the cooler of the air streams, and thus during the summer the water stream circulates together with the indoors air stream, while it circulates in contact with the outdoors air stream during the winter.

Heat transferred from the hotter air stream to the cooler air and water streams, causes vaporization of a portion of the water into its accompanying air stream.

The heat transferred will cause the hotter air stream to decrease in temperature and to condense a portion of its water vapor content, thus decreasing its humidity.

Conversely, the temperature and humidity of the cooler air stream will increase. Both outdoors and indoors air streams are thus kept substantially saturated with water vapor during their travel through the heat exchanger. The mass flowrates and the specific heats of both saturated steams being nearly equal, very close temperature approaches can be attained at the heat exchanger, the closeness depending essentially on the amount of heat exchanging surface available.

As a consequence and because of the countercurrent flow, the enthalpy of the outdoors air stream entering or leaving the heat exchanger is in close proximity to the enthalpy of the indoors air stream leaving or entering the heat exchanger.

Therefore, the extra heating and cooling loads that may be required to equalize the two enthalpies are relatively small, thus fulfilling the main purpose of this invention.

DETAILED DESCRIPTION

The invention will now be described in detail with reference to a specific embodiment, in which the heat exchanger is of the plate-fin type.

There are various types of heat exchangers suitable for use in the present invention. Examples are the shell and tube, plate and frame, spiral-plate and the plate-fin types, all of which are well known in the art. The plate-fin heat exchanger, commonly built out of aluminum, offer certain characteristics which are advantageous for the present application. Their compactness, light weight and large surface to volume ratio render them as particularly suitable for the purposes of this invention. Other important property is their relatively high heat transfer rates with a moderate pressure drop.

Because of these reasons they have been chosen as the preferred type for this invention.

Figure 2:
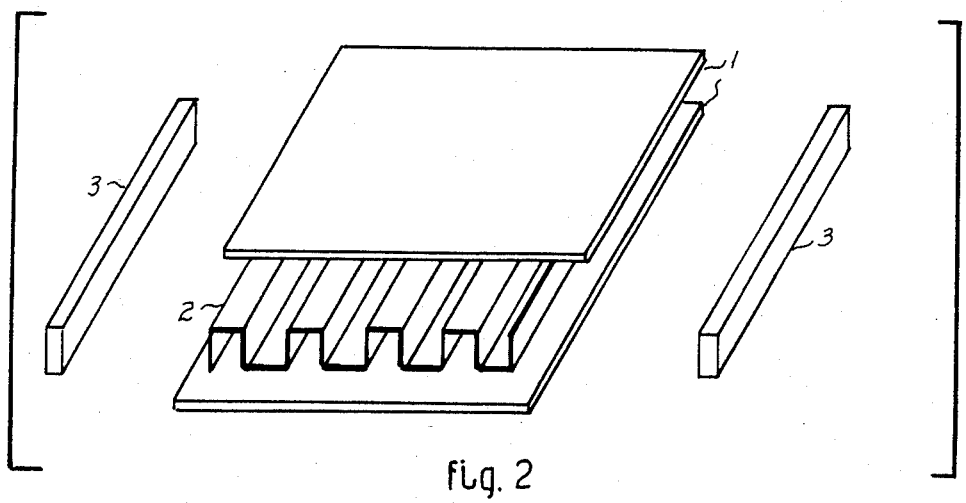
FIG. 2 is a perspective view of a single passage of a plate-fin heat exchanger.

A single passage of these exchangers consists of a pair of parallel plates, between which fins of various geometries are located. The fins, brazed to the plates to assure a good thermal contact, impart rigidity to the assembly. An exchanger requires a minimun of two contiguous passages. FIG. 2 shows an exploded view of a single passage. The plates are indicated with numeral 1, the fins with 2 and the closure bars with 3. The straight fins shown in FIG. 2 may be replaced by a wavy or herringbone pattern, or by a serrated type when higher heat transfer rates are required. Typical surface to volume ratios are in the order of 250 to 400 square foot per cubic foot.

Figure 1:
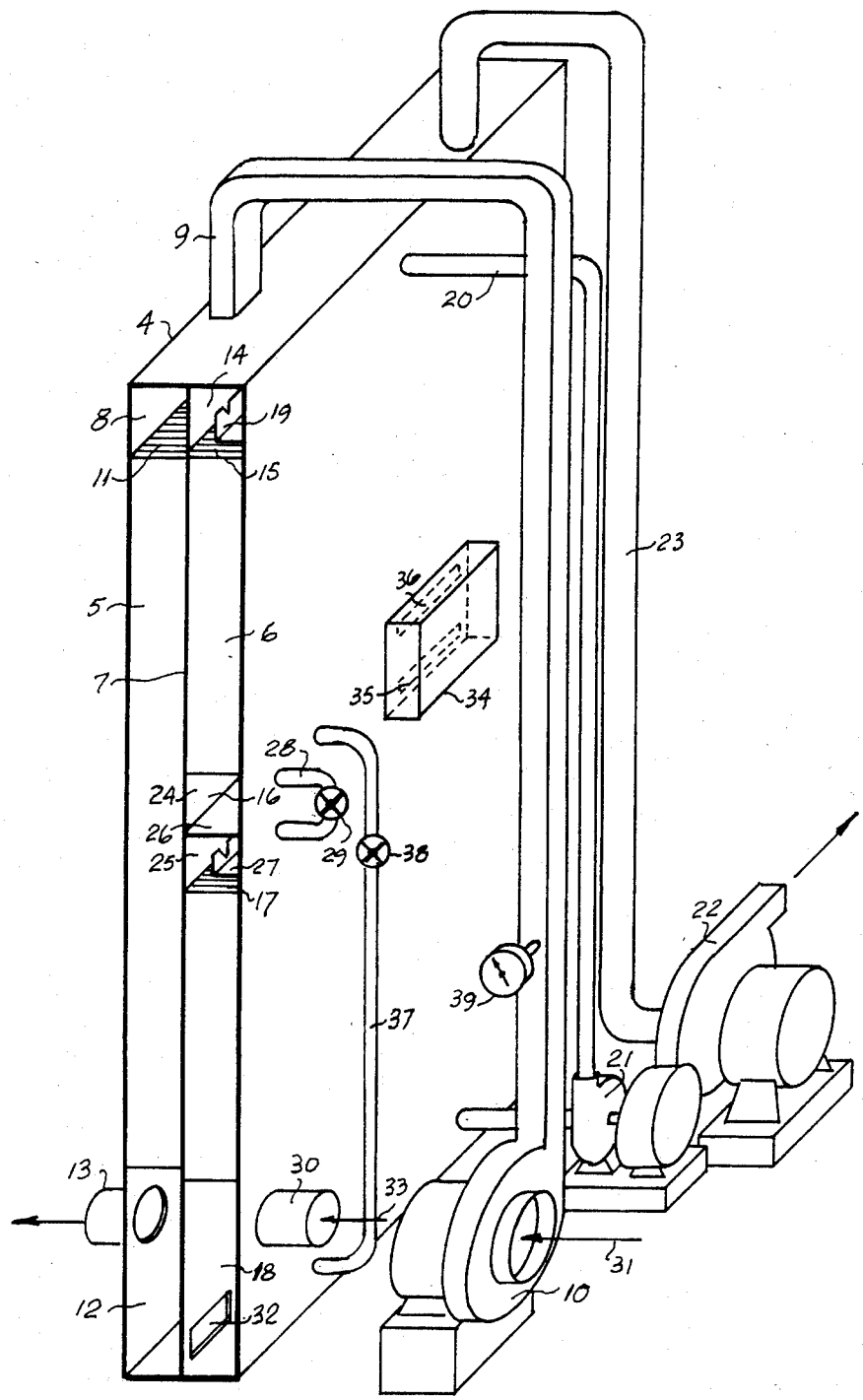
FIG. 1 is a perspective view of a preferred embodiment of an apparatus according to this invention.

Reference is now made to FIG. 1, in which the plate-fin exchanger 4 consists of two contiguous passages 5 and 6, separated by a common heat conducting partition 7. In the drawing, the front plate of the exchanger has been removed in order to show the internals.

A two single passages exchanger has in general sufficient heat transfer capacity for the ventilation of relatively small indoors spaces, such as one or two rooms of a dwelling.

Where larger capacities are required, a multiplicity of passages, connected in parallel, are used.

The passage 5 has an upper plenum 8, connected by duct 9 to the discharge side of blower 10. The finned space 11 extends from the upper plenum 8 to lower plenum 12.

Passage 6 is comprised by an upper plenum 14, an upper finned space 15, which extends down to the middle plenum 16, and a lower finned space 17 extending from middle plenum 16 to lower plenum 18.

The middle plenum 16 is divided into two zones 24 and 25 by plate 26. Liquid distributors 19 and 27 are located in the upper and middle plenums respectively. These distributors, of a U shape, run accross the depth of the passage. Their liquid discharge side has a serrated shape in order to provide a uniform distribution of the liquid over the fins below. The upper distributor 19 is connected by pipe 20 to the discharge side of pump 21.

The lower portion of zone 24, inmediately above plate 26, is connected by pipe 37 to the bottom of plenum 18. In addition, the lower portion of zone 24 is also connected to liquid distributor 27 by pipe 28. Shut-off valves 29 and 38 are located in pipes 28 and 37 respectively. The upper plenum 14 is connected to the suction side of blower 22 by duct 23. The flows of the indoors and outdoors air streams through the apparatus, during the cooling and heating seasons are now described with the aid of FIG. 7.

This drawing is a schematic flowsheet in which the heat exchanger 40 comprises two zones: 41 and 42. Zone 41 represents one or a multiplicity of passages similar to passage 5 of FIG. 1, all these passages being interconnected through common headers.

Zone 42 represents one or a multiplicity of passages similar to passage 6 of FIG. 1, and which are also interconnected through common headers. The broken line, surrounding exchanger 40 and blowers 44 and 54, represents the boundary separating the indoors from the outdoors.

During the summer, hot and humid outdoors air, stream 43, is drawn by blower 44 which discharges it into header 45. Valve 46 remains open while valve 47 is closed.

The air stream, after being cooled and dehumidified during its passage through zone 41, leaves through header 48 and enters the indoors through duct 49. Valve 51 remains open while 50 is closed.

Simultaneously indoors air stream 52 is drawn into bottom header 53 by blower 54. Valve 56 remains open while valve 57 is closed.

This air stream, which is heated and humidified while traversing zone 42, is discharged to the outdoors through duct 55. Valve 58 remains open while 59 is closed.

During the winter, room air stream 60 is drawn by blower 44 and after cooling and dehumidifying in zone 41 is expelled outdoors through duct 61. Valve 51 is now kept closed and valve 50 open.

At the same time, cold and dry outdoors air stream 62 is drawn by blower 54 and, after heating and humidifying in zone 42 is discharged into the room through duct 63. Valve 59 is now open while 58 is closed.

The operation of the apparatus shown in FIG. 1, which has been designed for year around operation, will be first described for summer operation. Hot outdoors air stream 31 is drawn into the suction port of blower 10, which discharges into the plenum 8 of passage 5. This air stream travels down the finned section 11 and exits into the room through nozzle 13. This fresh air stream replaces the room air stream 33, which is to be expelled outdoors. The suction exerted by blower 22 draws air stream 33 through nozzle 30 into the lower plenum 18 of passage 6.

Streams 31 and 33, which travel countercurrently through the heat exchanger, exchange heat across partition 7, the hotter stream 31 transferring heat to the cooler stream 33.

The fresh air stream cools down while traversing finned section 11 and portion of its water vapor content condenses out, the condensate collecting in a pool at the lower plenum 12.

This pool is in communication with an adjacent pool at the passage 6 via slots 32, located in the bottom of partition 7.

The lower plenums 12 and 18 being at substantially atmospheric pressure, there is a common level at both pools. The water level is kept, by any convenient control means, above the slots 32 in order to avoid mixing of air streams 31 and 33.

Water is circulated in passage 6 by the operation of pump 21, which takes suction from the water pool at plenum 18 and discharges it into the upper liquid distributor 19. The water is distributed over the finned section 15 and flows downwards, collecting in a pool over plate 26. From here it flows through pipe 28 into the liquid distributor 27, redistributed over section 17 and finally collecting in the lower pool in plenum 18.

During summer operation valve 29 is kept open and valve 38 closed. The water circulation rate is mainly determined by the requirement of wetting the fins surface. There is a minimun flowrate that will insure the wetting of the fins surface. In the generality of cases, this minimum is quite larger than the evaporation rate, with the consequence that the water flowrate through the exchanger is nearly constant.

The rates of heat transfer for a liquid film wetting the surface and undergoing evaporation into a gas phase are higher than for a dry surface with liquid droplets evaporating into the gas phase.

Consequently, for a given heat transfer duty, the "wetted surface" mode will result in less heat transfer surface requirements and thus, less costly than the "dry surface" mode.

The apparatus performs equally well when water is sprayed into the air stream, which can be accomplished with spray nozzles, the choice being a matter of relative costs.

Figure 3:
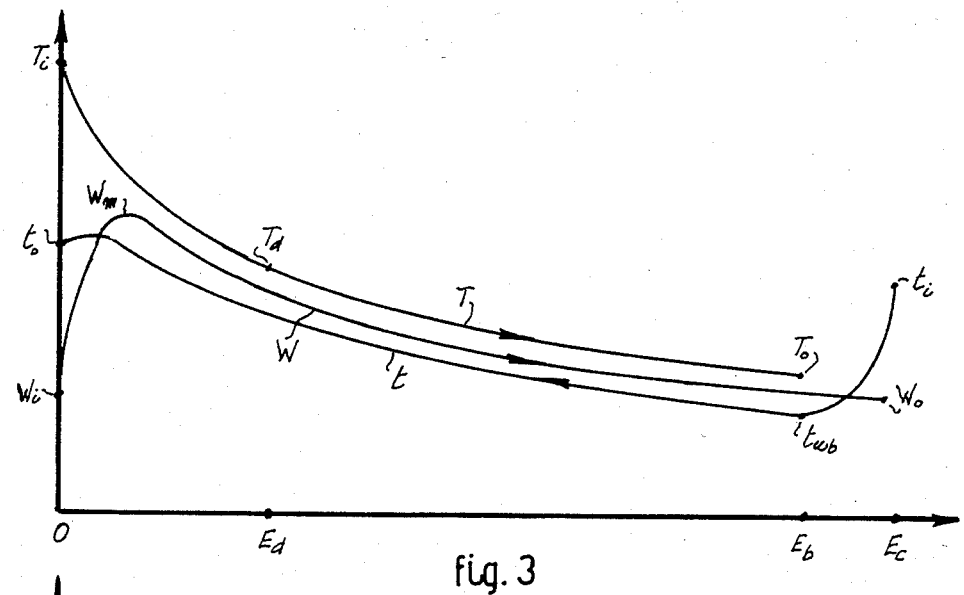
FIG. 3 shows typical temperature profiles for the various streams traversing the apparatus' heat exchanger. The temperature profiles, which have been plotted versus the exchanger length, are for hot weather operation of the invention.

Reference is now made to FIG. 3.

In this figure the exchanger length is plotted along the abscissa and the temperatures of the various streams along the ordinate.

The temperature profile for the outdoors air stream 31 is indicated by T, with t and W indicating the profiles for the room air stream 33 and water recycle stream respectively.

The exchanger length is measured from the upper to the lower plenums. The temperature profiles shown in FIG. 3 are for the steady state conditions and exclude the start-up and shut-down periods. Generally, these periods are of relatively short duration.

The fresh air stream 31 enters the exchanger top at its initial dry bulb temperature $T_i$ and is usually partially saturated with water vapor. The recycle water stream enters the exchanger top at a temperature $W_i$. The indoors air stream 33, enters the bottom of the exchanger at its dry bulb temperature $t_i$ and leaves the top at $t_o$, which lies within the interval $T_i$-$W_i$.

Stream 31 transfers, initially, sensible heat to the other two streams, the transfer continuing till its dew point $T_d$. Condensation starts here and continues through out the remainder of its travel through the exchanger. Stream 31 leaves the exchanger at $E_b$, at a temperature $T_o$ and saturated. The air stream 33, which is exhausted from the room, is first adiabatically cooled be contacting the water flowing in the lowest portion of finned space 17. The air is cooled from its dry bulb temperature $t_i$ to its wet bulb temperature $t_{wb}$, the cooling taking place in the length $E_b$-$E_c$. It may be noticed in FIG. 1 that the bottom of space 17 protrudes further down than the contiguous finned space 11. This extra surface is available for the adiabatic cooling of the indoors air stream.

With the exception of a relatively short length in the top of the exchanger, the temperature of the water recycle stream remains above the temperature of the indoors air stream.

The water stream temperature W always remains below the fresh air stream temperature T. Heat transfer from the latter to the former stream causes it to partially vaporize into the coldest air stream 33. The indoors air stream is thus kept saturated along the exchanger.

Because of the nearly equality of the mass flowrates and specific heats of the outdoors and room streams along the exchanger length comprised between $E_b$ and $E_d$, very close temperatures approach between both streams can be attained at the exchanger bottom $E_b$.

The temperature approach: $T_o$-$t_{wb}$, is a function of the amount of heat exchanging surface provided.

In practice, to keep costs at reasonable levels, the approach is of the order of about one to a few degrees Fahrenheit.

The enthalpy of the indoors air at temperature $t_i$ is equal to the enthalpy at its wet bulb temperature $t_{wb}$.

Due to the relatively small difference between the values for the enthalpies at temperatures $T_o$ and $t_{wb}$, the extra cooling load required to equalize both enthalpies is also relatively small.

Without heat exchange, the cooling load that would be required for the outdoors air stream to decrease its temperature and humidity to the ones prevailing indoors, would be equal to the difference in the stream enthalpies at temperatures $T_i$ and $t_{wb}$.

With heat exchange, according to this invention, the required cooling load is equal to the difference in the stream enthalpies at temperatures $T_o$ and $t_{wb}$. The cooling load with heat exchange is thus a small fraction of the cooling load without heat exchange, with the attendant savings in refrigeration duty.

The recycle water stream functions as a heat transfer medium between the hotter and the cooler air streams and, because all the heat lost by the hotter stream is gained by the cooler one, the net gain or loss of heat by the water stream is null.

As a consequence the temperature $W_i$ of the water entering the exchanger is substantially the same as the temperature $W_o$ of the water leaving it. The equality of the inlet and outlet temperatures is attained by the gain of a certain amount of heat in a portion of the exchanger followed by the loss of a same amount of heat in the remainder of the exchanger.

Heat is transferred, at relatively high rate, to the water recycle stream in the top of the exchanger, as may be seen in FIG. 3, where a rapid temperature raise, from $W_i$ to $W_m$, takes place. The heat gain is thus effected in this region. From this point on the water temperature gradually decreases to $W_o$, equal to $W_i$, this temperature being reached at the exchanger bottom $E_b$. The temperature profile t, for the indoors air stream, shows a maximum in the top region of the exchanger. The temperature decrease, as it approaches the origin of coordinates, is due to heat transferred from the indoors air to the water stream, causing a temperature drop in the air and simultaneous condensation of some of its water vapor into the water stream.

The operation of the apparatus during the winter season will now be described. Stream 31, in FIG. 1, represents now the warm room air to be exhausted, while stream 33 represents the cold and dry air to be brought into the room from the outdoors.

The warm room air, stream 31, traverses from top to bottom the passage 5 of the exchanger, the required pressure drop being generated by blower 10. Outdoors air, stream 33, is drawn into the lower plenum 18 of passage 6, flows upwards through the finned section 17, zone 25 and bypasses plate 26 through box 34. Slots 35 and 36, respectively located below and above plate 26, interconnect zones 25 and 24, thus allowing the air stream to bypass plate 26. The air stream, after crossing the finned section 15, enters plenum 14 and flows through duct 23 into the suction port of blower 22, which discharges indoors.

The recycle water stream, which is kept circulating by pump 21, enters the passage 6 through the liquid distributor 19, flows downwards along finned space 15 and collects in an intermediate pool over plate 26. Pipe 37 transfers the liquid from this pool to the lower pool, at plenum 18, from where is drawn into the pump suction and recycled back into liquid distributor 19. The valve 29 is now kept closed while valve 38 is closed.

It may be noticed that the liquid stream now bypasses the lower finned section 17, which, for reasons that will soon become apparent, is kept dry, or non-irrigated, during the winter.

Figure 4:
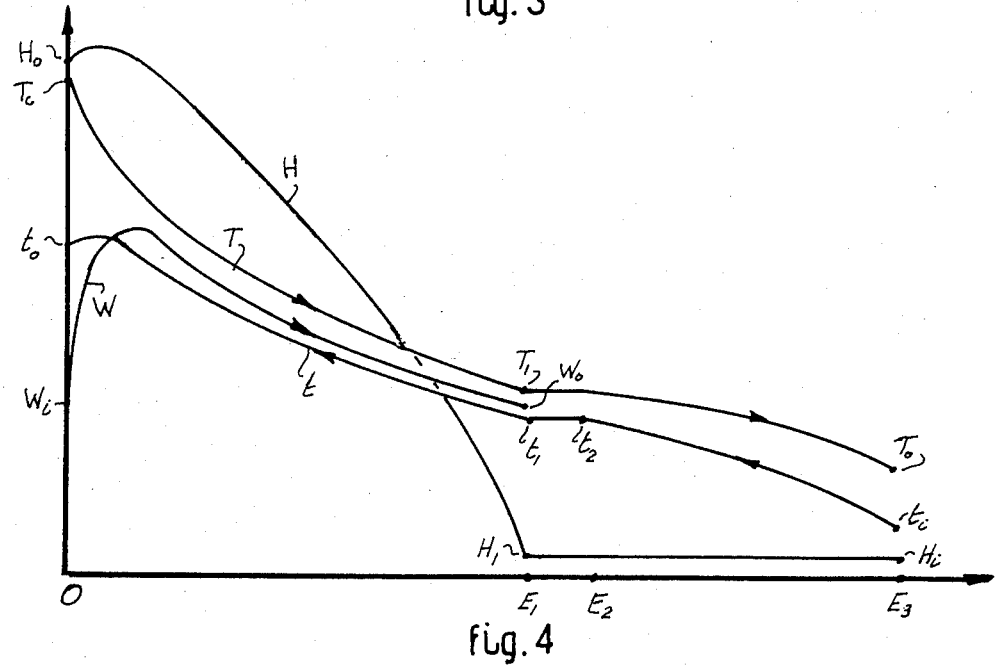
FIG. 4 is a plot similar to FIG. 3, but for cold weather operation. It includes in addition, the typical profile for the humidity of the cold outdoors air stream.

Reference is now made to FIG. 4, in which the temperatures profiles of the various streams are plotted versus the length of the exchanger. It also plots the humidity content of the outdoors air stream along the length of the heat exchanger.

The length is indicated along the abscissa, the origin of coordinates corresponding to the top of the finned spaces 11 and 15. Temperatures and humidity are indicated along the ordinates.

The arrows in the curves indicate the flow direction for the streams crossing the exchanger.

Outdoors air stream flows upwards through the finned section 17, gaining the heat that is transferred to it from the hotter room air stream, which flows downwards in the adjacent finned section 11.

Irrigation is not provided in this section due to the possibility of icing when contacting an air stream, at sub-freezing temperatures, with water. With the liquid flowrates contemplated here, massive plugging of the exchanger passages would rapidly occur, rendering it inoperative.

The amount of heat transfer surface provided in section 17 and its inmediately adjacent section in passage 5, is such that, under the specified design conditions for the outdoors and indoors, the temperature $t_2$ of the air stream leaving the top of section 17 will be kept in the neighborhood of 32° F. or higher.

This temperature remains nearly constant, due to negligible heat transfer, as the air stream bypasses plate 26 and enters into the bottom of section 15. This is shown by the horizontal line joining points $t_1$ and $t_2$, located at $E_1$ and $E_2$ respectively.

The finned section 11 that faces the section 17 of passage 6 is represented, in FIG. 4, by the interval $E_2$-$E_3$.

The temperature profile T, for the room air stream, indicates that the temperatures range from $T_1$ down to $T_2$, in this region. When sub-freezing temperatures are present in the interval $T_1$-$T_o$, ice deposition over the fins surface will occur.

Due to the low humidity content of the air entering this lower region of section 11, and to the relatively large surface available, it takes a sizable time for the build-up of an ice layer of a few thousands of an inch thick. In practicing the present invention, the ice layer is allowed to grow in thickness for a certain period of time, which causes a gradual increase in the gas pressure drop across section 11.

When the pressure drop reaches a predetermined value, the pressure control 39, which is electrically interlocked with the motors of blower 22 and pump 21, will deenergize them and cause the stoppage of the cold outdoors and the water recycle flows.

The warm air stream, flowing over the iced surface, will now melt the ice in a relatively short period of time, causing the excess pressure drop to decrease to zero. This, in turn, will restore the flows of the outdoors air and the water recycle streams.

A cycle of about two hours for ice deposition followed by about three to five minutes for ice thawing would be typical.

In the upper finned section 15, whose length is represented by abscissa $E_1$, sensible and latent heat is transferred from the room air stream to the water recycle and the outdoors air stream. Partial vaporization of the water into the latter stream takes place.

The typical temperature profiles are indicated with the letters T for the room air stream, W for the water recycle stream and t for the outdoors air stream. The profile of the humidity content of the outdoors stream is indicated with the letter H.

The outdoors air stream enters the bottom of section 15 at a temperature $t_1$, which is in the neighborhood of 32° F. or higher, and with a relatively low humidity, indicated by $H_1$. Its humidity increases rapidly as it ascends through the passage 6, and becomes saturated with water vapor.

The characteristic shape of the temperature profiles shown in FIG. 4 is similar to the ones already mentioned for summer operation, and thus further description can be dispensed with.

In addition, the same arguments made for summer operation, and that explained the attainment of close temperature approaches at the exchanger ends, are applicable here.

The humidity profile H indicates a decrease in humidity in the proximity of the origen of coordinates. This is due to cooling with simultaneous condensation of water vapor from the outdoors air stream, the cooling being caused by heat transfer from the outdoors stream to the water recycle stream.

The humidity content $H_o$, of the outdoors air stream leaving the exchanger at temperature $t_o$, has, typically, values close to the humidity content of indoors air. As a consequence, the enthalpy for the heated and humidified outdoors air has a value close to the enthalpy of the indoors air.

Therefore, the heating load required required to equalize both enthalpies is a relatively small fraction of the total heating load required for ventilation. It can be concluded that the heat recovered from the exhausted indoors air is a substantial fraction of the recoverable heat, which results in substantial savings in fuel.

To illustrate the application of the principles and advantages of this invention, an example for a year around ventilation of a building is presented.

The building of this example is an auditorium with capacity for 500 persons. Fresh air requirements, that has been established at 10 cfm. per person, amount to 5,000 cfm (cubic foot per minute).

The selected design conditions for the outdoors and indoors air, at the specific geographical location for this building are:

|  | Outdoors | Indoors |
| --- | --- | --- |
| Summer operation |  |  |
| Dry bulb temperature, °F. | 95 | 75 |
| Wet bulb temperature, °F. | 80 | 63 |
| Effective temperature, °F. |  | 70 |
| Dew point, °F. | 75 | 56 |
| Relative humidity, % | 50 | 50 |
| Humidity, lb/lb. dry air | 0.0188 | 0.0096 |
| Enthalpy, Btu/lb. dry air | 43.69 | 28.58 |
| Winter operation |  |  |
| Dry bulb temperature, °F. | −10 | 75 |
| Wet bulb temperature, °F. | −11 | 63 |
| Effective temperature, °F. |  | 70 |
| Dew point, °F. | −17 | 56 |
| Relative humidity, % | 60 | 50 |
| Humidity, lb/lb. dry air | 0.0003 | 0.0096 |
| Enthalpy, Btu/lb. dry air | −2.2 | 28.58 |

For these design conditions, the desired temperature approaches, and an air flow of 5,000 cfm per stream, I estimated that a plate-fin heat exchanger, containing approximately 12,000 square foot of surface, would be required. For this amount of surface, a multiplicity of single passages are required, the passages being stacked in a core.

The core consists of a stack of parallel single passages, similar to passages 5 and 6 of FIG. 1, in which passage 5 is non-irrigated while passage 6 is irrigated, partially or totally, depending on the season.

In the stack, each irrigated passage is flanked by two non-irrigated ones.

In other words, irrigated and non-irrigated passages are assembled in consecutive order.

Headers, interconnecting passages of the same type, are provided in the core. The required 12,000 sq. ft. of surface are obtained by stacking 132 single passages, each passage measuring approximately 6 ft. high, 3 ft. wide and ½ inch thick.

Figure 5:
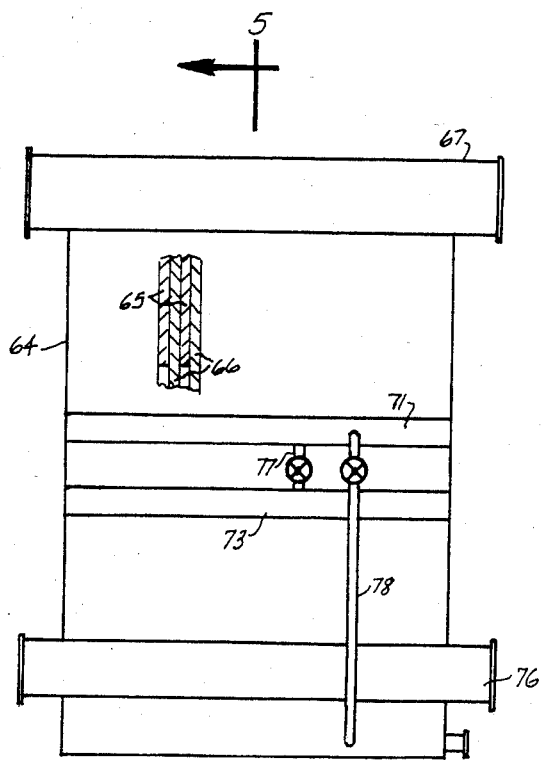
FIG. 5 is a front elevation view of a plate-fin heat exchanger which contains a large number of single passages. Also depicted are the headers which interconnect a series of single passages.
Figure 6:
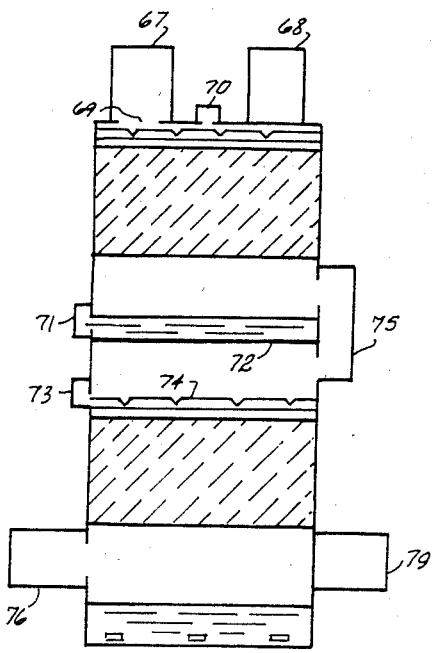
FIG. 6 is a cross sectional view through the vertical plan 5—5, at FIG. 5.

Reference is now made to FIGS. 5 and 6.

FIG. 5 is a frontal elevation view of the core, indicating the location of some of the headers. A cut-out in the front plate of the core shows a stack of four single passages, in which irrigated passages are indicated with numeral 65, numeral 66 indicating non-irrigated ones.

FIG. 6 is a cross sectional view by a vertical plane through 5—5 in FIG. 5. The cross section is taken through one of the irrigated passages, which is similar to passage 6 of FIG. 1.

The hatched areas represent the upper and lower finned section of the passage. Also shown are the intermediate and lower water pools.

The assembled core 64, measures approximately 6 ft. high, 5 ft. wide and 3 ft. deep.

Header 67 interconnects all the upper plenums of the irrigated passages, while header 68 does the same for the non-irrigated ones.

Cut-outs 69, made in the portion of the top plate covering the irrigated passages, tie all these passages into the header 67.

Similar cut-outs are made at the non-irrigated passages, which tie them into header 68.

The same method applies to all the remaining headers, the shape and size of the cut-outs being governed by the geometrical shape of the passages and by the requirement of admissible pressure drops at the streams flowing through them.

Header 70 carries the water recycle stream. Header 71 collects the water flowing out from all intermediate liquid pools over plates 72.

Header 73 redistributes the water flows into the lowers distributors 74. Header 75 transfers the air flow from the plenums below plates 72 to the plenums above.

Header 76 interconnects all lower plenums of the irrigated passages, while header 79 does the same for the non-irrigated ones.

Pipe 77 transfers, during summer operation, the liquid from header 71 to 73. Pipe 78 transfers, during winter operation, the liquid from header 71 to the lower water pool.

Figure 7:
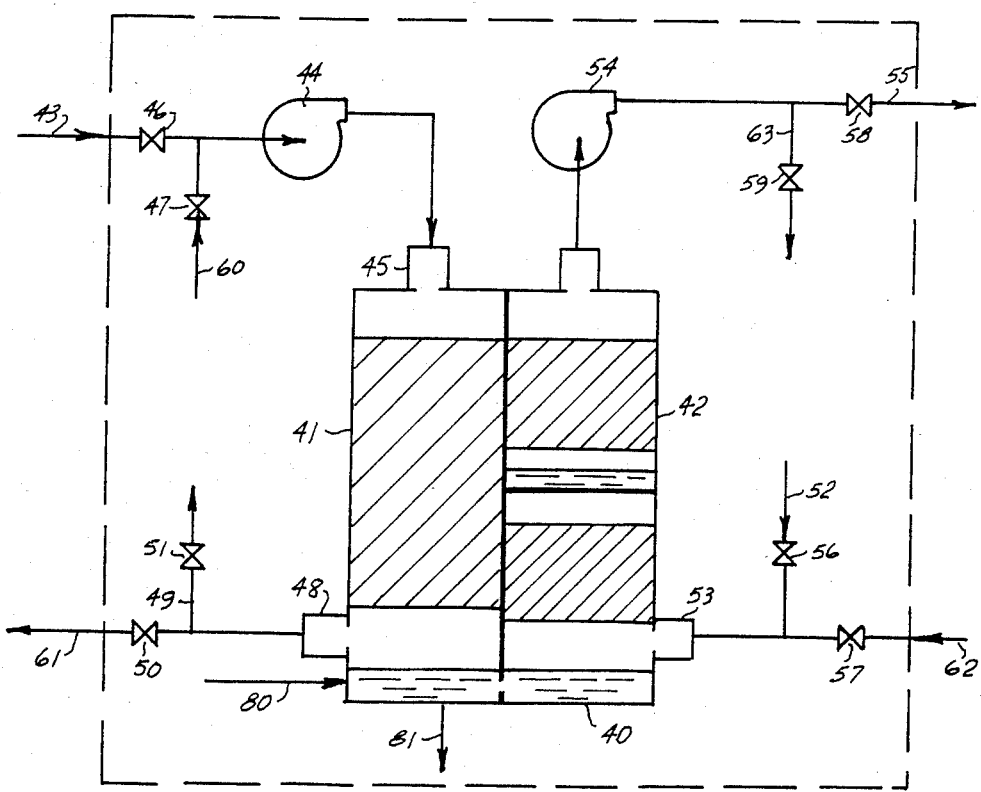
FIG. 7 is a schematic flowsheet of an apparatus according to this invention showing the ducting arrangement and air flows directions for year around operation.

The connections of the various headers with the indoors and outdoors atmospheres are schematically shown in FIG. 7, and have been described in another part of this specification.

Water make-up requirements, indicated by numeral 80, are provided by the use of conventional liquid control devices.

Due to the vaporization of a portion of the water recycle stream, there will be, in time, an accumulation of salts in the liquid that may induce undesirable scaling over the exchanger surface. An intermittent purge stream 81 will keep the salts concentration at the proper level.

The operation of the core is similar to the one already described for the two single passages exchanger shown in FIG. 1, with the main difference being the even split of the flows into the series of passages.

Therefore, the temperature and humidity profiles for the core are similar to the ones already considered for the two passages heat exchanger.

I estimated that, the core of this example would deliver the 5,000 cfm of outdoors air into the building, at the following temperatures and enthalpies:

Summer operation

Temperature, °F.: 64.6
Enthalpy, Btu/lb. dry air: 29

Winter operation

Temperatures, °F.: 55.1
Enthalpy, Btu/lb. dry air: 23.27

The extra cooling load for the outdoors, fresh air, during summer operation is calculated from the data above to be 9450 Btu/Hour or 0.7875 tons of refrigeration.

This extra cooling load is necessary to bring the enthalpy of the cooled outdoors air stream down to the enthalpy of the indoors.

Without the use of the present invention, the cooling load would have been 28.33 tons of refrigeration.

Savings of 27.54 tons of refrigeration, or about 97% of the total load, are thus achieved by the use of this invention, with the concomitant sizable saving in capital investment and operating costs.

For the winter operation, the heat recovered from the exhausted air stream amounts to about 83% of the total heat requirements for the ventilation of the building, which represents a sizable economy in fuel.

The above description shall not be construed as limiting the ways in which this invention may be practiced but shall be inclusive of many other variations that do not depart from the broad interest and intent of the invention.

I claim:

1. A process for ventilating indoors spaces, during the hot season, consisting of: passing a stream of outdoors air through a heat exchanger of the plate-fin type, passing a like stream of indoors air through said heat exchanger, said outdoors air having a higher temperature and humidity than said indoors air, said outdoors and indoors air streams flowing vertically and countercurrently in adjacent passages of said heat exchanger, transferring heat across said adjacent passages, from the outdoors air stream to the indoors air stream, cooling said outdoors air stream, condensing water vapor from the outdoors air stream into a first water film, said film wetting a substantial portion of the surface of the passages occupied by said outdoors air stream, said first water film flowing cocurrently to said outdoors air stream, causing a second water film to flow and wet a substantial portion of the surface of the passages occupied by said indoors air stream, said second water film and the indoors air stream flowing in countercurrent relationship, heating the indoors air stream, evaporating water vapor from a portion of said second water film into said indoors air stream, collecting and joining said first flowing film with the remaining liquid portion of said second flowing film, returning the collected water to the top of the passages occupied by the indoors air stream, transferring said cooled and dehumidified outdoors air stream from the heat exchanger to the indoors space, transferring said heated and humidified indoors air stream from the heat exchanger to the outdoors.

2. A process for ventilating indoors spaces, during the cold season, consisting of: passing a stream of outdoors air through a heat exchanger of the plate-fin type, passing a like stream of indoors air through the heat exchanger, said indoors air having a higher temperature and humidity than said outdoors air, said indoors and outdoors air streams flowing vertically and countercurrently in adjacent passages of said heat exchanger, transferring heat across said adjacent passages, from the indoors air stream to the outdoors air stream, cooling said indoors air stream, condensing water vapor out of the indoors air stream into a first water film, said film wetting a major portion of the passages occupied by the indoors air stream and flowing cocurrently to said indoors air stream, keeping the lower portion of the passages occupied by the outdoors air stream at temperatures below 32° F., keeping the remaining portion of said passages at temperatures above 32° F., causing a downward flow of a second water film over said upper portion, heating said outdoors air stream and evaporating a portion of said second water film into said outdoors air stream, collecting the remaining portion of said second water film, joining said remaining portion with said first water film, returning said joined first and second films to the top of the passages occupied by the outdoors air stream, transferring said heated and humidified outdoors air stream from the heat exchanger to said indoors space, tranferring said cooled and dehumidified indoors air stream from the heat exchanger to the outdoors.

3. A process for ventilating indoors spaces during the cold season, as claimed in claim 2, in which the pressure drop across said heat exchanger's passages occupied by said indoors air stream, is controlled by pressure control means, the control means causing the flow stoppage of said outdoors air stream and said second water film when the pressure drop exceeds a predetermined value, the pressure control means causing the flow restoration of said streams when the pressure drop returns to its predetermined value.

4. An apparatus for ventilating confined spaces, comprising: a plate-fin heat exchanger composed of a sequence of parallel, vertically located contiguous air passages, every other air passage of such sequence having an upper and a lower finned sections, said finned sections being separated by a gap, an horizontal plate dividing the gap into an upper and a lower zones, liquid transfer means between said upper and lower zones, air transfer connecting means between said upper and lower zones, an upper plenum located above the top of the upper finned section, a lower plenum located below the bottom of the lower finned section, liquid transfer means from the upper zone of said gap to the lower plenum, an upper liquid distributor located in said upper plenum, a lower liquid distributor located in the lower zone of said gap, interconnecting means for air and liquid flow between said alternating passages which are characterized by having upper and lower finned sections, means to induce flow of air through said alternating passages, means to induce flow of air through the adjacent passages to said alternating passages and, means to circulate water through the passages provided with liquid distributors.

* * * * *